United States Patent [19]

Lichte, Jr.

[11] 3,938,255

[45] Feb. 17, 1976

[54] CANTILEVER-TYPE INCLINOMETER

[75] Inventor: Henry P. Lichte, Jr., Houston, Tex.

[73] Assignee: Geolograph Industries, Oklahoma City, Okla.

[22] Filed: Mar. 7, 1974

[21] Appl. No.: 449,228

[52] U.S. Cl. .................................. 33/311; 33/398
[51] Int. Cl.² .......................................... G01C 9/12
[58] Field of Search ............ 33/308, 310, 311, 312, 33/366, 391, 398

[56] References Cited
UNITED STATES PATENTS

| | | | |
|---|---|---|---|
| 2,089,153 | 8/1937 | Monroe | 33/311 |
| 2,305,944 | 12/1942 | Wiley | 33/311 |
| 3,096,655 | 7/1963 | Peterson | 33/398 |

FOREIGN PATENTS OR APPLICATIONS

| | | | |
|---|---|---|---|
| 141,501 | 3/1953 | Sweden | 33/391 |
| 976,893 | 3/1951 | France | 33/312 |

Primary Examiner—Richard E. Aegerter
Assistant Examiner—Steven L. Stephan
Attorney, Agent, or Firm—William S. Dorman

[57] ABSTRACT

Apparatus for determining the inclination of a well bore comprising a flexible rod having an upper end rigidly supported by the apparatus and a needle point means operatively connected with the lower end of said rod and suspended over a vertically movable target. The target is responsive to a predetermined condition, such as time or location, for moving the target relatively towards and against the needle point whereby the needle point will perforate the target to indicate the inclination of the well bore. A weight means is mounted on the flexible rod above the needle point to cause a bending of the rod by cantilever action when the apparatus is in the well bore and when the well bore is inclined with respect to the vertical.

1 Claim, 6 Drawing Figures

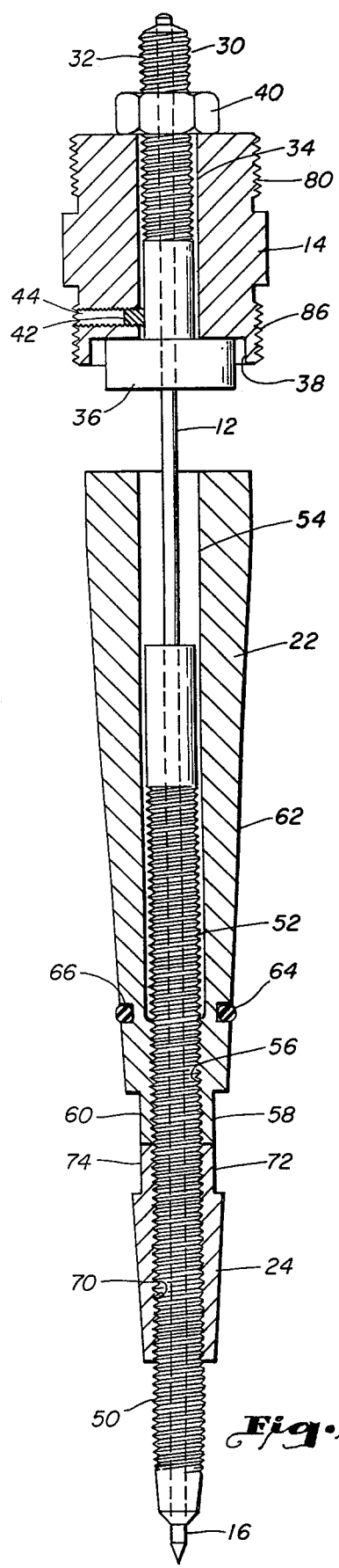
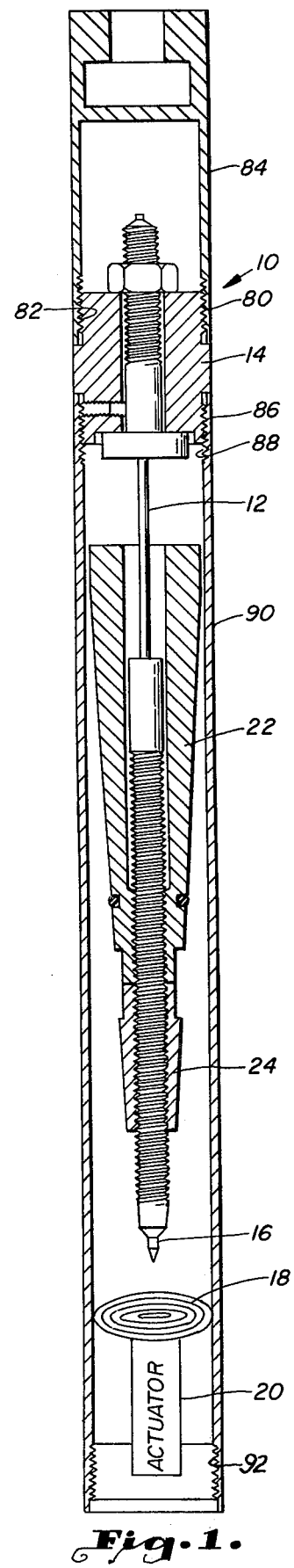
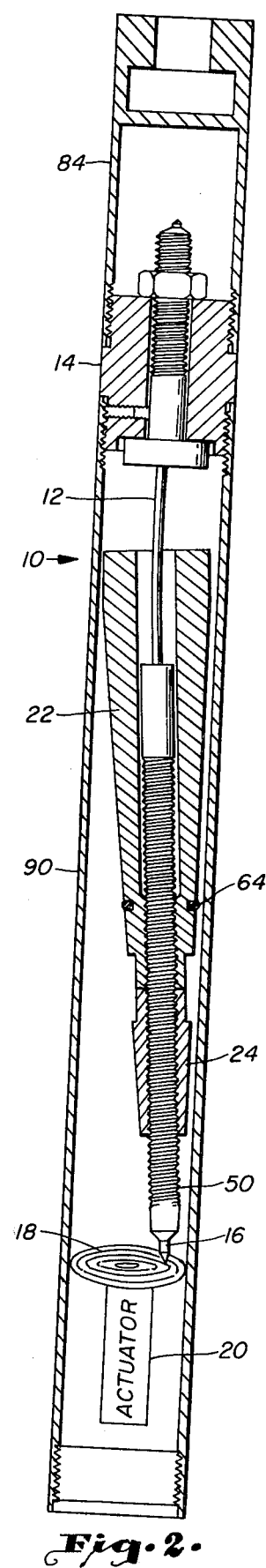
Fig. 3.
Fig. 1.
Fig. 2.

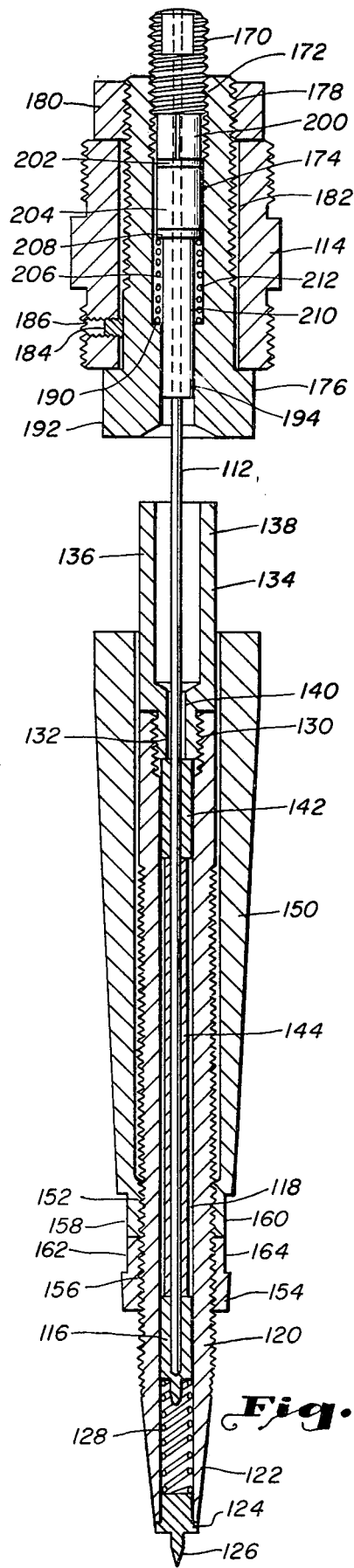
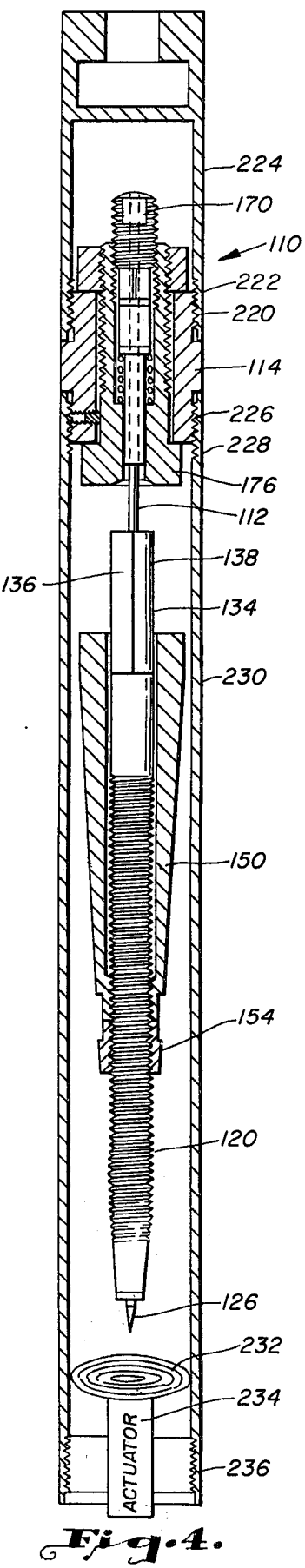
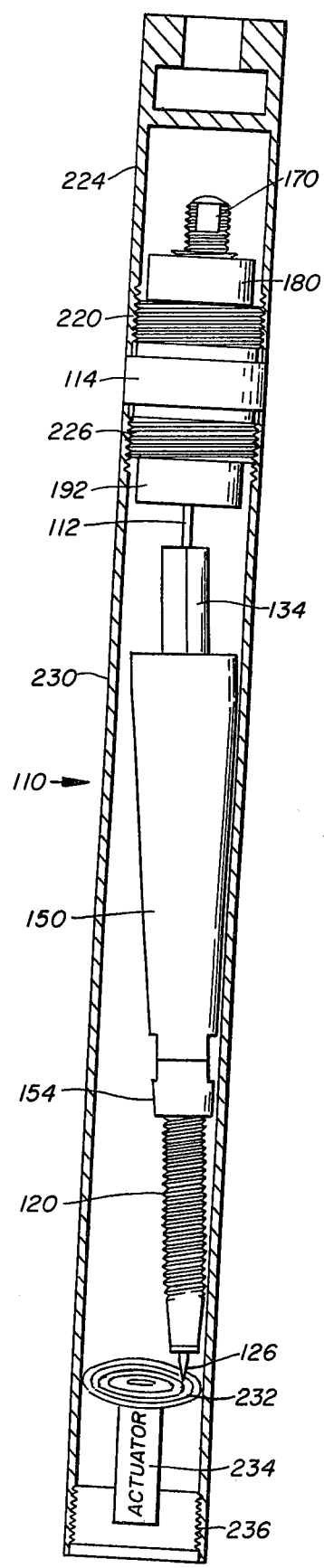
Fig. 6.
Fig. 4.
Fig. 5.

025
CANTILEVER-TYPE INCLINOMETER

BACKGROUND OF THE INVENTION

1. Field of the Invention

The present invention relates to an apparatus for determining the inclination of a well bore.

2. Description of the Prior Art

There are many prior art patents and disclosures which describe various instruments for determining the inclination of a well bore. Generally speaking, most of these prior art disclosures involve a movable target suspended below a needle point. Also, in most cases, the needle point carries a weight and is suspended by a gimbel. By this arrangement, the needle point will be always hanging down vertically from the gimbel regardless of the disposition of the instrument itself. At an appropriate time the target will be moved relatively upwardly with respect to the needle point to cause perforation or punching of the target. When the apparatus is brought to the surface, the target can be inspected and the inclination of the well bore determined thereby. Typical prior art patents Webster, U.S. Pat. No. 1,905,546; Monroe, U.S. Pat. No. 2,057,787; and Murata, U.S. Pat. No. 2,670,547.

SUMMARY OF THE INVENTION

The distinguishing characteristic of the present invention is the elimination of the conventional gimbel support for the weighted needle point. The present invention includes a weight, a needle point and a movable target; however, the weight is suspended from the lower end of a flexible rod, the upper end of which is rigidly fixed within the apparatus. When the apparatus is in the well bore and the well bore is inclined with respect to the vertical, the weight will cause the rod to bend by cantilever action thus displacing the needle point with respect to the center of the target. On the other hand, the line between the needle point and the upper fixed support of the flexible rod will not be vertical as in the case of the prior art gimbel type support. By varying the diameter or stiffness of the rod selected, the amount of deflection of the needle point with respect to the center of the target can be varied for a given inclination of the well bore thereby increasing the angular range over which the instrument can operate. Stated differently, for the same operative range of angles, the diameter of the instrument case can be decreased when using the cantilever type of inclinometer as disclosed in the present application.

BRIEF DESCRIPTION OF THE DRAWINGS

FIG. 1 is a vertical longitudinal sectional view through an inclinometer representing one embodiment of the present invention showing the apparatus in a substantially vertical position with the needle point spaced above the target.

FIG. 2 is a view similar to FIG. 1 but showing the apparatus in an inclined position with the target means having been actuated so that the needle point has perforated the target;

FIG. 3 is an enlarged sectional view of the main components shown in FIG. 1;

FIG. 4 is a view similar to FIG. 1 but showing a modified form of inclinometer made pursuant to the present invention;

FIG. 5 is a view similar to FIG. 2 but showing the apparatus of FIG. 4; and

FIG. 6 is an enlarged sectional view of the main components of FIG. 4.

DESCRIPTION OF THE PREFERRED EMBODIMENTS

Referring to the drawings in detail, FIG. 1 shows an inclinometer generally designated by the reference character 10. The inclinometer includes, basically, an elongated rod or bar 12 suspended at its upper end from a collar 14 and having a point 16 at its lower end. The pointed end 16 cooperates with a movable target 18 which is elevated at an appropriate time by an actuator 20 which is merely diagrammatically shown. The details of the actuator are not provided because the actuator can be any of several well-known types such as shown in the prior art patents referred to above. The rod 12 has weights 22 and 24 mounted thereon and vertically movable along the rod 12 in a manner later to be described.

Turning now to a consideration of FIG. 3, the upper end of the rod or bar 12 is received within the central bore of a round headed bolt 30 the threaded shank 32 of which extends upwardly through a central bore 34 in the collar 14. The round head 36 of the bolt 30 is received within a circular recess 38 at the bottom of the collar 14. A nut 40 is threadably received on the upper end of the bolt 30 to hold the bolt within the bore 34 of the collar 14. Three equally spaced set screws 42 (only one of which is shown in FIG. 3) are threadably received in radial threaded openings 44 to position the shank 32 of the bolt 30 in the approximate center of the bore 34. The upper end of the rod or bar 12 extends through the shank 32 of the bolt 30 and is connected thereto by welding, brazing or soldering, however, in such manner that the temper of the rod 12 is not undesirably altered.

An elongated threaded cylindrical member 50 is mounted on the lower end of the rod 12 and extends upwardly from the point 16 for a substantial distance along the rod 12. The threaded member is provided with a threaded portion 52 which extends for substantially the entire length of the member. The weight 22 is preferably in the form of a tapered elongated sleeve having a central bore 54 at the lower end of which is a threaded opening 56 of reduced size with respect to the bore 54. The threaded opening 56 engages the threaded portion 52 of the elongated cylindrical member 50. At the lowermost end of the weight 22 are a pair of opposed flat portions 58 and 60 to permit the turning of the weight 22 by a wrench or the like. Along the lower portion of the tapered side 62 of the weight 22, an "O" ring 64 is mounted within a suitable annular groove 66 for a purpose which will be explained hereinafter. The lower weight 24 (which is actually a locking nut) is provided with a central threaded bore 70 and a pair of flat portions 72 and 74 which will permit the turning of the member 24 by means of a wrench or the like so as to lock against the lower end of the weight 22. The rod 12 extends through the cylindrical member 50 for substantially the entire length thereof and is secured thereto by soldering, welding or brazing provided, however, the heat involved in the attaching step does not detrimentally affect the temper of the rod 12. The lower pointed end 16 of the rod 12 projects below the lower end of the cylindrical threaded member 50.

Returning now to a consideration of FIG. 1, the upper end of the collar 14 is threaded as at 80, and this upper threaded end 80 is received within the lower threaded end 82 of a hollow cylindrical cap 84. Similarly, the lower end of the collar 14 is threaded as at 86 and this lower threaded end is received within the upper threaded end 88 of a hollow cylindrical casing 90. The lower end of the cylindrical casing 90 is provided with a threaded opening 92 which is adapted to receive the upper threaded end of a plug or the like (not shown) which supports or includes the actuator 20 and the target 18.

In operation, the inclinometer shown in FIG. 1, with the plug (not shown) secured within the lower threaded opening 92 of the casing 90, is lowered into a well or bore hole by any suitable means (not shown). The inclinometer as shown in FIG. 1 is also preferably enclosed in an outer casing (not shown) which is completely fluid-tight. At any event, when the inclinometer is lowered to the proper depth, and the actuator 20 is actuated, the target 18 will be elevated until the pointed end 16 punches a hole in the target. The position of the punched hole, (not shown) with respect to the center of the target, will indicate how far off the inclinometer 10, and hence, the well bore, is from the vertical.

As shown in FIG. 2, the inclinometer 10 is inclined because the well bore would be correspondingly inclined. Because of the inclination, the weights 22 and 24 have caused the rod 12 to bend as shown such that the point 16 has engaged the target 18 at a position removed from the center of the target. When the inclinometer has been returned to the surface, the punch mark on the target 18 will indicate the inclination of the well bore at the point where the reading was taken. Note that the "O" ring 64 would engage the inner-surface of the casing 90 and prevent contact between the casing and the weights 22 and 24.

Prior to lowering the inclinometer 10 into the well bore, it would be necessary to ensure the proper calibration of the instrument. Since the bending of the rod 12 is a cantilever effect, the spacing of the circles on the target 18 would be predisposed in accordance therewith. For a known deflection or inclination of the inclinometer 10, the actuator 20 is actuated until the point 16 punches or perforates the target 18. If the position of the punch or perforation is incorrect, the weight 22 is moved upwardly or downwardly by first loosening the locking member 24 and then threadably moving the weight 22 upwardly or downwardly on the threaded cylindrical member 50 after which the locking member 24 is locked in place.

The embodiment shown in FIGS. 4, 5 and 6 illustrates an inclinometer 110 having a bar or rod 112 supported from a collar 114. The lower end of the rod or bar 112, however, as best shown in FIG. 6, is secured to a small cylindrical fitting 116 by soldering, welding, etc.

The adapter 116 is received adjacent the lower end of the bore 118 of an elongated cylindrical threaded member 120. The lower end of the cylindrical member 120 is tapered as at 122 and the lower end of the bore 118 is closed by a small plug 124 which carries a point 126. The plug 124 is secured in the bore 118 by means of welding, soldering, etc. A spring 128 is received in the lower end of the bore 118 between the upper end of the plug 124 and the bottom of the adapter 116. The upper end of the bore 118 is provided with a slightly enlarged threaded opening 130 to receive the lower threaded end of a split cylindrical sleeve 134. The split cylindrical sleeve 134 is formed of two semicylindrical portions 136 and 138 as shown in FIG. 4. The lower ends of mating portions 136 and 138 not only form the lower threaded portion 132 but also provide a bore 140 which loosely surrounds the rod 112. Mounted on the rod 112 below the threaded portion 132 is another sleeve 142 loosely received on the threaded rod 112 and having an outer diameter greater than the bore 140 of the sleeve 134. Between the sleeve 142 and the fitting 116 is still another elongated sleeve 144 having an outer diameter less than the diameter of the bore 118. When the split sleeve 134 is screwed into the threaded opening 130, it exerts a force on the sleeve 142 and, in turn, on the sleeve 144 and, again in turn, against the fitting 116 so as to compress somewhat the spring 128 which is located between the adapter 116 and the plug 124.

Mounted on the outside of the elongated threaded member 120 is a tapered weight 150 which is provided with a lower threaded opening 152 which engages the outer threads of the threaded cylindrical member 120. A locking nut 154 having an inner threaded portion 156 engages the threads of the cylindrical member 120 below the weight 150. Flat portions 158 and 160, 162 and 164 are located on the weight 150 and the nut 154, respectively, to permit the tightening of the locking member 154 against the bottom of the weight 150 by wrenches or the like.

The upper end of the rod or bar 112 is secured to a cylindrical threaded nut 170 by soldering, welding, etc. The nut 170 is adapted to be received in the upper threaded end 172 of a bore 174 of an elongated roundheaded bolt 176. The upper end of the round-headed bolt 176 is provided with an exterior threaded portion 178 on which is received a nut 180. The interior bore 182 of the collar 114 is somewhat larger than the exterior threaded portion of the bolt 176; however, the bolt 176 is centrally located with respect to the bore 182 by means of three equally spaced and radially directed set screws 184 (only one of which is shown in FIG. 6); the set screws 184 are threadedly received in radial threaded openings 186.

The bore 174 in the nut 176 extends down to a shoulder 190, and from the shoulder to the round head 192 is a bore 194 of reduced size. The bore 194, however, is sufficient size to permit the insertion of the fitting 116 and sleeve 142 therethrough.

Mounted on the rod 112 within the bore 174 is a split cylindrical washer 200, another thinner washer 202, a plastic washer 204, and an elongated plunger 206 the latter having an enlarged round head 208 of substantially the same outer diameter as the bore 174 and an elongated shank portion 210 having an outer diameter substantially equal to the lower bore 194. A spring 212 is located within the bore 174 between the head 208 of the plunger 206 and the shoulder 190.

Turning now to a consideration of FIG. 4, the upper end of the collar 114 is provided with an external threaded portion 220 which is adapted to be received in the lower threaded end 222 of a cap 224. The lower end of the collar 114 is provided with external threads 226 which are adapted to be received in the upper threaded end 228 of a hollow cylindrical casing 230. Disposed below the point 126 is a movable target 232 which is substantially the same as the movable target 18 described in relation to FIGS. 1 and 2. The movable target 232 is adapted to be moved upwardly at the appropriate time by an actuator 234 substantially the same as the actuator 20 described in relation to FIGS.

1 and 2. The lower end of the casing 230 is provided with a threaded opening 236 adapted to receive a plug (not shown) or supporting or containing the actuator 234 and the target 232.

As shown in FIG. 5, the inclinometer 110 is disposed at an angle to the vertical and the actuator 234 has been actuated so that the point 126 has perforated or punched the target 232.

When lowering the inclinometers of FIGS. 1 to 6 into a well bore, (not shown), the inclinometer is preferably enclosed in an outer casing (not shown) which is completely fluid-tight.

From the foregoing it will appear that the bearings and gimbels of the prior art have been eliminated. The apparatus of the present invention operates on the same principle as the loading on a beam. When the rod is hanging straight, it has no load and, therefore, there is no deflection. As the instrument is inclined, the rod starts to deflect in a predictable manner which is amplified by the length of the rod below the weight. The circles on the target are spaced so as to transpose deflection into degrees of inclination of the instrument. The size of the weight can be varied, of course, to increase or decrease the range of the instrument. Also, as set forth above, the position of the weight can be varied by moving it vertically upwardly or downwardly on the threaded rod after which the lower member, which is a lock nut, can be locked against the bottom of the weight to hold the weight in a fixed position.

In the embodiment shown in FIGS. 4 to 6, the vertical position of the point with respect to the target can be varied by turning the threaded nut 170 clockwise or counter-clockwise as desired. Furthermore, this embodiment shows a spring 128 positioned between the lower end of the adapter 116 and the plug 124 which carries the point 126. The purpose of the spring means 128 is to cushion any shocks that might occur when the instrument encounters an obstruction in being lowered into a well bore.

Whereas the present invention has been described in relation to the drawings set forth herein, it should be understood that other and further modifications, apart from those shown or suggested herein, may be made within the spirit and scope of this invention.

What is claimed is:

1. Apparatus for determining the inclination of a well bore comprising a flexible rod having an upper end and a lower end, means in said apparatus for rigidly supporting said upper end of said rod, a target means, means for vertically moving said target means needle point means operatively connected with said lower end of said rod and suspended over said vertically movable target means, means responsive to a predetermined condition for moving said target means relatively towards and against said needle point means, an elongated threaded cylinder mounted on said flexible rod above said needle point means, weight means having a threaded opening therein engaging the threads on said elongated threaded cylinder whereby said weight means can be rotated on said elongated threaded cylinder to move said weight means upwardly or downwardly, said weight means causing bending of said rod by cantilever action when said apparatus is in said well bore and said well bore is inclined with respect to the vertical, and a lock nut means mounted on said elongated threaded cylinder for locking against said weight means to hold said weight means in fixed vertical position on said elongated cylinder.

* * * * *